United States Patent
Majava

(10) Patent No.: US 7,984,381 B2
(45) Date of Patent: Jul. 19, 2011

(54) USER INTERFACE

(75) Inventor: Laura Majava, Helsinki (FI)

(73) Assignee: Nokia Corporation, Espoo (FI)

( * ) Notice: Subject to any disclaimer, the term of this patent is extended or adjusted under 35 U.S.C. 154(b) by 761 days.

(21) Appl. No.: 11/085,378

(22) Filed: Mar. 18, 2005

(65) Prior Publication Data
US 2006/0236266 A1 Oct. 19, 2006

(51) Int. Cl.
G06F 3/048 (2006.01)
(52) U.S. Cl. ........................ 715/767; 715/810
(58) Field of Classification Search .................. 715/767, 715/764, 810, 725, 856
See application file for complete search history.

(56) References Cited

U.S. PATENT DOCUMENTS

| | | | |
|---|---|---|---|
| 6,011,546 A * | 1/2000 | Bertram | 715/700 |
| 6,067,070 A * | 5/2000 | Suzuki et al. | 345/660 |
| 6,400,996 B1 * | 6/2002 | Hoffberg et al. | 700/83 |
| 6,661,438 B1 * | 12/2003 | Shiraishi et al. | 715/835 |
| 6,700,612 B1 * | 3/2004 | Anderson et al. | 348/333.11 |
| 6,957,397 B1 * | 10/2005 | Hawkins et al. | 715/856 |
| 7,159,177 B2 * | 1/2007 | Billmaier et al. | 715/720 |
| 2004/0221243 A1 * | 11/2004 | Twerdahl et al. | 715/834 |
| 2006/0123359 A1 * | 6/2006 | Schatzberger | 715/810 |
| 2009/0138825 A1 * | 5/2009 | Duarte | 715/838 |

* cited by examiner

Primary Examiner — Tadeese Hailu
Assistant Examiner — Darrin Hope
(74) Attorney, Agent, or Firm — Harrington & Smith

(57) ABSTRACT

A user interface with a display and user input for a mobile telephone that provides a set of icons or other user selectable objects in a number of different idle mode screens. The user interface has two modes. In a focused mode, the user input can change focus so that the user can focus and select a desired object from a presented idle mode screen. In a non-focused mode, none of the objects is focused. Instead of changing the focus from one object to another, the user input now can change the idle mode screen itself so that different predefined contents can be accessed with a limited user input.

29 Claims, 2 Drawing Sheets

USER INTERFACE

FIELD OF THE INVENTION

This invention relates to user interfaces and is particularly, but not necessarily, related to user interfaces for portable devices such as mobile telephones.

BACKGROUND OF THE INVENTION

Various electronic devices contain a display for presenting different content and one or more keys to input user commands and text. The equipment used for interacting between the device and user is often referred to as a user interface or UI. Present mobile telephones, for example, comprise keypads, displays, speakers, microphones and sometimes even external accessory keyboards and handwriting recognising pens for data input and output.

The new mobile telephones also provide internet connections. These may provide specially adapted content in the form well-suited for mobile telecommunications (e.g. WAP or OMA standards). Some phones enable browsing ordinary HTML based web pages. The browsing is provided via a given browsing application that the user can access via menu selections or a shortcut. Moreover, the mobile phones often provide time management related functions such as notebook, alarm, calendar and meeting reservation functions. These may each be accessed via respective applications and functions as provided by the manufacturers.

Nokia® 9000, 9110, 9210 and 9500 communicators and Nokia® 9300 Smart Phones have a clam-shell form where the interior of the clam-shell has a complete, miniature size qwerty-keyboard and a fair display above the keyboard. Between the numeric keys and the hinge, there are application or service specific dedicated short-cut keys using which the user may quickly access desired applications or services. However, these keys take space and do not double for any other purpose.

The vast amount of personally interesting and useful information stretches the limits of present user interfaces. Hence, there is a need to improve the user access to useful information.

SUMMARY OF THE INVENTION

According to a first aspect of the invention there is provided a device comprising:
  a display for presenting content comprising two user selectable objects capable of presenting one of the objects as a focused object;
  a user input for reading navigation commands configured to cause the display move the focus from the focused object to another object thereby changing the focused object; and
  a controller for changing the operation of the device between a focused and non-focused mode so that in the focused mode the focused object is changeable responsive to the navigation commands and in the non-focused mode, the content presented by the display is changeable responsive to the navigation commands.

Advantageously, the same navigation commands can be used for either selecting a user desired object from within the presented content or to change the presented content. This removes or reduces the need for multiple input means such as dedicated keys whilst allowing easy access to different content displays or screens.

The device may be mobile telephone. A mobile telephone gains particular benefit from enhanced access to various types of information with limited user input enabled by the invention according to the first aspect. Alternatively, the device may be selected from a group consisting of television, set top box, personal computer, Personal Digital Assistant (PDA) and gaming device.

The controller may be configured to change the operation of the device from focused to non-focused mode responsive to detecting an idle period in user interaction meeting a predetermined threshold interval. The controller may further be configured to change the operation of the device from non-focused to focused mode responsive to detecting a confirmation command from the user input. The confirmation command may be given in the same way as in starting an application or service corresponding to a focused object in the focused operation mode.

It is advantageous to automatically enter the non-focused mode after a predetermined idle time. Thus, the user gains very easy access to desired information (content) by simply using the navigation commands such as scrolling with a multi-way navigation device.

The device may be configured to provide a set of different idle mode pages containing different content including user selectable objects. The user input may be configured to enable navigating between the idle mode pages in a relative fashion so that a navigation command changes a presented idle mode page to another one dependent on the currently presented idle mode page. This enables navigating a set of idle mode pages with navigation commands fewer in number than the idle mode pages. Alternatively, instead of relative fashion, each idle mode page may be mapped to a corresponding navigation command. This enables very fast and intuitive navigation. Alternatively, two or more of the idle mode pages may be mapped to corresponding navigation commands whilst one or more of the idle mode pages are not mapped to the navigation commands.

According to a second aspect of the present invention, there is provided a controller for controlling a device comprising a display for presenting content comprising two user selectable objects capable of presenting one of the objects as a focused object and a user input for reading navigation commands configured to cause the display move the focus from the focused object to another object thereby changing the focused object; wherein the controller is configured to change the operation of the device between a focused and non-focused mode so that in the focused mode the focused object is changeable responsive to the navigation commands and in the non-focused mode, the content presented by the display is changeable responsive to the navigation commands.

According to a third aspect of the present invention, there is provided a method of controlling a device comprising a display for presenting content comprising two user selectable objects capable of presenting one of the objects as a focused object and a user input for reading navigation commands configured to cause the display move the focus from the focused object to another object thereby changing the focused object; the method comprising enabling changing of the operation of the device between a focused and a non-focused mode so that in the focused mode the focused object is changeable responsive to the navigation commands and in the non-focused mode, the content presented by the display is changeable responsive to the navigation commands.

According to a fourth aspect of the present invention, there is provided a computer program for controlling a device comprising a display for presenting content comprising two user selectable objects capable of presenting one of the objects as a focused object and a user input for reading navigation commands configured to cause the display move the focus from the focused object to another object thereby changing the focused object; the computer program comprising computer executable program code for enabling the device change its operation between a focused and a non-focused mode so that in the focused mode the focused object is changeable responsive to the navigation commands and in the non-focused mode, the content presented by the display is changeable responsive to the navigation commands.

According to a fifth aspect of the present invention, there is provided a computer program product comprising a computer program according to the fourth aspect. The computer program product may comprise a memory medium with the computer program stored thereon.

The embodiments of one aspect may also apply to various other aspects of the invention. In sake of briefness, the embodiments have not been repeated in connection with every aspect of the invention. A skilled reader will appreciate the advantages of the various aspects based on the advantages of any aspect of the invention.

BRIEF DESCRIPTION OF THE DRAWINGS

The invention will now be described, by way of example only, with reference to the accompanying drawings, in which.

DETAILED DESCRIPTION

Figure 1:
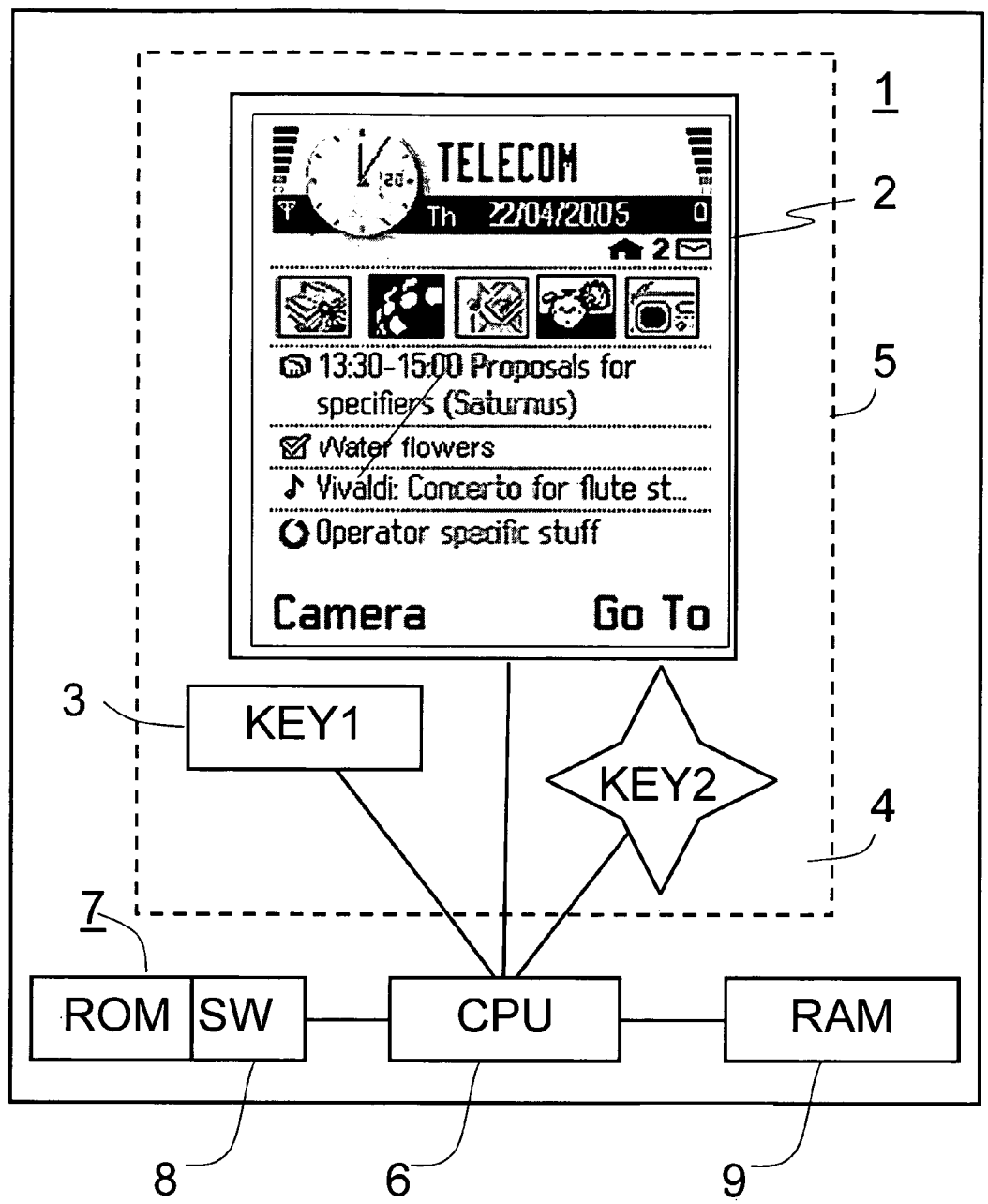
FIG. 1 shows a block diagram of a mobile telephone capable of implementing the present invention.

FIG. 1 shows a block diagram of a mobile telephone capable of implementing the present invention. The mobile telephone 1 or phone in short comprises user interface 5 that contains a display 2 for displaying content (such as text, images and icons) and keys 3 and 4 for user input. The phone 1 further comprises processing equipment 6 to 9 for controlling the operation of the phone 1. The phone 1 also contains normal circuitry for performing the normal operation of a cellular phone.

The processing circuitry comprises a processor 6 that may be a Master Control Unit (MCU) of the phone 1 or a dedicated or shared other processor such as a microprocessor (e.g. a Central Processing Unit CPU) or Digital Signal Processor (DSP). The processor generally controls various operations of the phone including the operation of the user interface 5. Non-volatile or long-lasting memory 7 contains operating instructions 8, that is software, according to which the processor 6 operates. Under normal operation, the processor typically loads to the operation instructions 8 from the long-lasting memory 7 to a work memory 9 that is typically of Random Access Memory (RAM) type. Alternatively, the process may execute the operating instructions directly within the long-lasting memory.

When switched on, mobile telephones typically first enter an idle mode in which they may communicate with a radio access network and negotiate different connection parameters, but are not yet engaged into any particular user interaction. Most phones usefully display indications of remaining battery charge and present signal strength and often they also display the present time, date, operator name and cell information. However, to access other interesting information, the user has to navigate through menu or icon arrangements to display such information.

According to an embodiment of the present invention, the phone 1 has three basic idle modes:
1. Passive idle mode containing only traditional idle mode information such as missed calls, time, field strength and battery charge.
2. Focused active idle (AI) mode, in which the phone 1 follows user input and respectively processes the presently displayed content.
3. Non-focused AI, in which the user may entirely change the presently displayed content between two or more predetermined presentations.

For instance, in the focused AI mode, the display 2 may present a set of icons one of which is focused and identified by some particular highlighting. By using the keys 3, 4 of the phone, the user can change the focus from one icon or object in general to another, without actually changing the basic layout and information content of information on the screen, that is, the presentation displayed. In the non-focused AI mode instead, using the keys 3, 4 changes the presentation itself. The focused and non-focused AI states advantageously use common presentations. The user may configure one or more such presentations and/or the phone may contain pre-configured presentations. These presentations may contain icons, reminders, images or generally any potentially interesting content or desired content to which an easy access is desired. The very same user input can be used for changing the focus between objects of the presentation when in the focused AI mode and between the presentations when in the non-focused AI mode. The non-focused AI mode thus enables very efficient way for the user to access with different presentations containing different information or groups of information to the user.

The user input has been shown to comprise only two keys for simplicity, but typical phones are expected to provide a twelve-key keypad. The modern telephones often also provide a key with two or more different directions of operation (for instance, two-way, four-way and five-way rocker keys or positioning sticks). In the following, the operation of the phone 1 is described assuming that key 4 is a five way key, with rims usable on four compass directions for selecting objects in respective directions and a centre for confirming selections or providing a function corresponding to a legend shown on the display 2, thus operating as a soft key.

Figure 2:
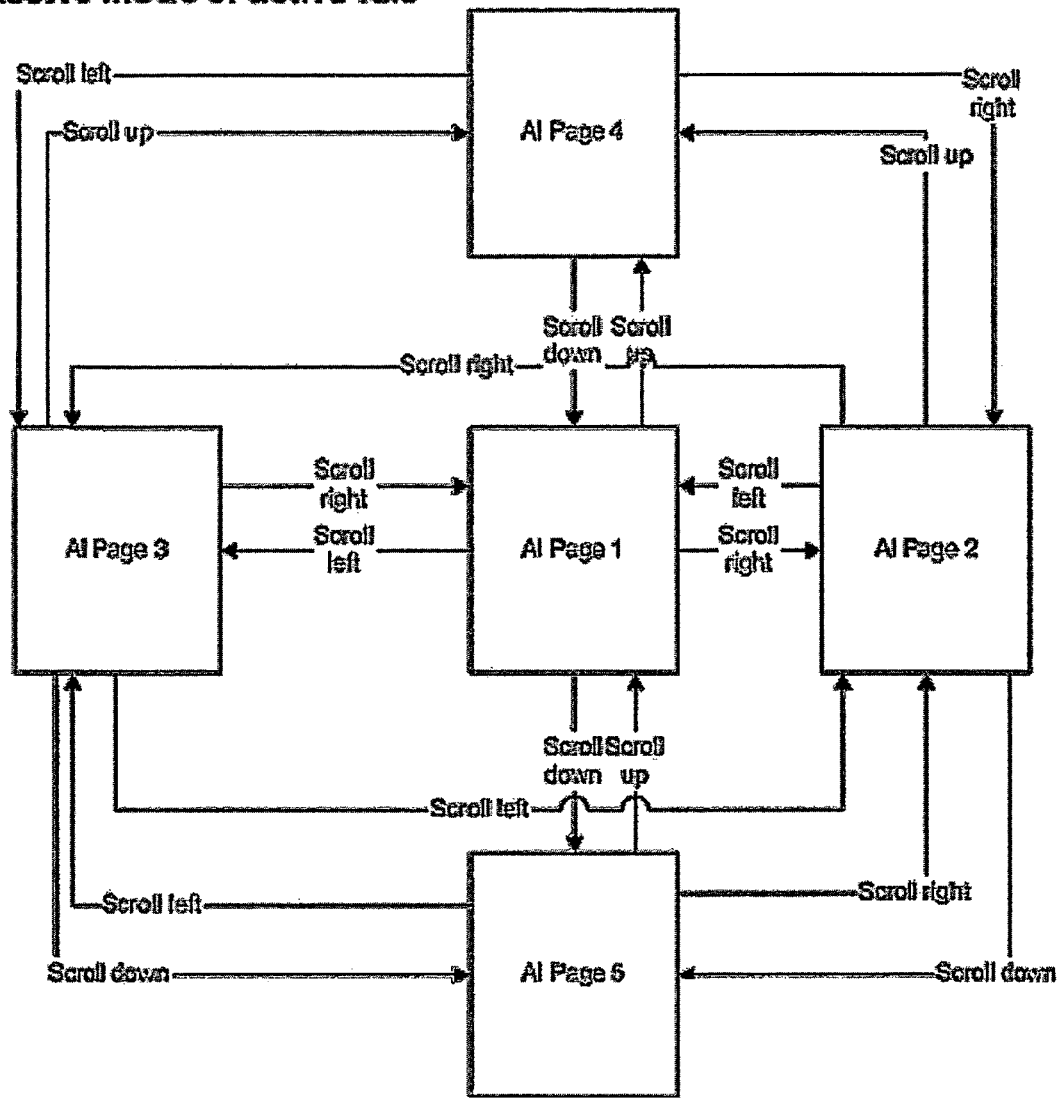
FIG. 2 shows a state diagram illustrating transitions made for showing a different active idle page.

FIG. 2 shows a state diagram illustrating transitions made for showing a different AI page or presentation when in the non-focused AI mode. FIG. 2 presents five different displays by their name (AI page 1 to 5) wherein AI page 1 is a default page. Navigating to any of the four directions changes to an AI page in the respective direction if possible, except that when an outermost AI page is already presented, then no change is made. Alternatively, the selection of the page may roll over the edges so that, for example, navigating right from the default AI page 1 first changes the AI page 2 to be presented and navigating right again jumps to the left-hand side AI page 3.

The transition between the three basic modes can be implemented in a number of ways. It is advantageous to not only provide the AI modes but also allow a user to enable the normal passive idle mode. The user interface preferably provides a user selection via a menu or icon based control panel where the user may enable or disable the AI mode. The transition between the focused and non-focused AI, however, should be very easy to accomplish. Whilst any methods known in the art for selecting an operating mode can be used including short cut keys and menu choices or soft keys, it is recommended to use a time trigger to switch from focused to non-focused AI when a predetermined idle period with no user operations has been detected.

The content of the different AI pages can be partly or entirely preconfigured. For instance, one page may contain messaging information such as number of received unread and read short messages, multimedia messages, e-mail messages and facsimile messages. One page may contain time management information including to-do lists or list items, pending or next calendar items and current presence status used in instant messaging. One page may contain important controls for adapting the operation of the phone 1, including audio controls for adjusting sound volume and media control such as track selection and playback or recording control, display adjustment control including brightness and contrast and so on. One page may contain user selected items from any or given phone functions such as preferred game pointers, on-line instant messaging or chatting text boxes, remote control for external devices such as audio visual equipment. One page, such as the default page, may also contain the same information as a traditional passive idle mode page such as field strength, battery charging status, date, time, operator name, profile name, user name, message indicators, key and phone lock indicators, incoming call indicators, data call indicators and soft key legends. Also all of the items listed in the foregoing (in connection with any of the exemplary pages) can be combined with one another or to form different AI pages or presentations, either under user customisation or prefixed by phone manufacture, operator or some other customisation service provider. For instance, most essential operational information such as battery and field indications are advantageous to present on all pages and may be required for type approval.

The user is advantageously informed of the present basic idle mode. This can take place by displaying a dedicated text or icon on the display or by suitably highlighting either an object presented on the display (indicating focused AI mode with the focus on the highlighted object) or by highlighting the displayed content as a whole or to a substantial portion thereof. The highlighting is advantageously provided by a coloured boundary or frame around the desired area or by changing the brightness, contrast, colour or texture of such area being highlighted. Alternatively, any other means known from the art of highlighting particular parts of a displayed content can be used including different text colour or attributes such as blinking or underlined text.

To enhance the user experience, the user interface advantageously provides an undo function where using the user input to an opposite direction or by some other way the user commands undoing the last action. In case of navigating from one AI page to another, an intuitive undo mechanism is simply to navigate back by the opposite side of the five way key 4. In order to access any object or objects linked or presented on a desired AI page, the user can simply press the centre of the five way key 4. This changes the basic idle mode from non-focused to focused AI mode and advantageously also focuses one of the objects on that AI page. In case of only one alternative is present for a user to perform on the desired AI page, that alternative is advantageously simultaneously selected and executed as expected by the user: for example, a hyperlink is opened in an internet or file browser, an image enlarged, e-mails retrieved when inbox is opened, or a game or video started if a respective icon is selected.

In order to undo accidental changing to the focused AI mode, the user is advantageously provided with a respective soft key or menu choice via which the user can return to the non-focused AI mode. Alternatively, or additionally, the transition between focused and non-focused AI mode in either or both directions can be made using a predetermined key, soft key or combination of keys or by using an icon or other object provided for this purpose. The non-focused AI mode is also advantageously entered after the threshold time has been idled.

As the AI modes may expose the user to accidentally displaying personal information to anyone who sees the display 2, the phone can be configured to automatically revert to the default AI page 1 after a given period of idle time. The user can also be let customise the order of AI pages, that is, to decide which page follows which one if the user navigates in them by repeatedly using the same navigation command. It is also advantageous an option to provide the user with an access to the different AI pages without changing idle mode page used. This option provides an easy temporary access to interesting information.

The user input is advantageously provided by means of one or more keys. Alternatively, the phone 1 can utilise speech recognition or touch screen or machine vision configured to perceive the motion of the user or users hand or finger.

To facilitate the use of the different AI pages, the display 2 is advantageously configured to present a miniature map illustrating available other AI pages. The miniature map preferably provides the user with the present position in a navigation structure and some reminder of the content within the available other AI pages or all the AI pages.

The passive idle mode (mode 1) can also be dispensed with. In such a case, one of the presentations or AI pages of modes 2 and 3 advantageously should provide corresponding information.

Particular implementations and embodiments of the invention have been described. It is clear to a person ordinarily skilled in the art that the invention is not restricted to details of the embodiments presented above, but that it can be implemented in other embodiments using equivalent means without deviating from the characteristics of the invention. For example, embodiments of the invention were described with a mobile telephone 1 as an example. Alternatively, the invention could be used in various other types of devices, including televisions, set top boxes (in which case they may contain a dedicated display or use a TV as a display), personal computers, personal digital assistants (PDA) and gaming devices. Hence, the scope of the invention is only restricted by the attached patent claims.

I claim:

1. An apparatus comprising:
   a display configured to display a single presentation page of two or more available presentation pages, where the single displayed presentation page comprises content comprising a plurality of displayed objects, one of which the display is configured to present as a focused object;
   a user input configured to detect at least one user selected navigation command; and
   a controller configured to change the operation of the apparatus between a focused mode and a non-focused mode so that
   in the focused mode the at least one detected user selected navigation command is configured to select a displayed object of the single displayed presentation page as the focused object, and
   in the non-focused mode the same at least one detected user selected navigation command is configured to switch the single displayed presentation page to another one of the two or more available presentation pages.

2. The apparatus according to claim 1 embodied in at least one of a mobile telephone, television, set top box, personal computer, Personal Digital Assistant or a gaming device.

3. The apparatus according to claim 1, wherein the controller is further configured to change the operation of the apparatus from focused mode to non-focused mode responsive to detecting an idle period in user interaction meeting a predetermined threshold interval.

4. The apparatus according to claim 1, wherein the controller is further configured to change the operation of the apparatus from non-focused mode to focused mode responsive to detecting a confirmation command from the user input.

5. The apparatus according to claim 1, wherein the two or more available presentation pages is from a set of different presentation pages, whereby each of the different presentation pages contain different content including user selectable objects.

6. The apparatus according to claim 5, wherein the non-focused mode the user input is configured to enable navigating between the presentation pages so that each presentation page is mapped to a corresponding navigation command.

7. The apparatus according to claim 1, wherein the controller is capable of enabling or disabling the access to the non-focused mode.

8. The apparatus according to claim 1, wherein the controller is capable of receiving user instructions and of enabling or disabling the access to the non-focused mode responsive to the user instructions.

9. The apparatus according to claim 1, wherein the same user input causes the focused object to change when the apparatus is operating in a focused mode and causes the presentation page to change when the apparatus is operating in a non-focused mode.

10. The apparatus according to claim 1, where in the non-focused mode none of the objects of the displayed presentation page is focused.

11. A controller for controlling a device, comprising:
a display configured to display a single presentation page of two or more available presentation pages, where the single displayed presentation page comprises content comprising a plurality of displayed objects, one of which the display is configured to present as a focused object;
a user input configured to detect at least one user selected navigation commands; and
the controller is configured to change the operation of the device between a focused mode and a non-focused mode so that
in the focused mode the at least one detected user selected navigation command is configured to select a displayed object of the single displayed presentation page as the focused object, and
in the non-focused mode the same at least one detected user selected navigation command is configured to switch the single displayed presentation page to another one of the two or more available presentation pages.

12. A controller according to claim 11, wherein the controller is configured to change the operation of the device from focused mode to non-focused mode responsive to detecting an idle period in user interaction meeting a predetermined threshold interval.

13. A controller according to claim 11, wherein the controller is configured to change the operation of the device from non-focused mode to focused mode responsive to detecting a confirmation command from the user input.

14. A controller according to claim 11, wherein the controller is configured to cause the display to provide, when the device is idle, the presentation page out of the two or more presentation pages, whereby each of the different presentation pages contain different content including user selectable objects.

15. The controller according to claim 11, where in the non-focused mode none of the objects of the displayed presentation page is focused.

16. A memory medium encoded with a computer program executable by a processor to perform the actions for controlling a device comprising:
displaying a single presentation page of two or more available presentation pages, where the single displayed presentation page comprises content comprising a plurality of displayed objects, from which one of the displayed objects is presented as a focused object;
detecting at least one user selected navigation commands on the device; and
enabling the device to change its operation of the device between a focused mode and a non-focused mode where
in the focused mode a displayed object of the displayed presentation page presented as a focused object is changed to another displayed object of the single displayed presentation page being presented as the focused object in response to the detected user selected navigation commands, and where
in the non-focused mode the single displayed presentation page is switched to another one of the two or more available presentation pages in response to the same user selected navigation command.

17. The memory medium encoded with a computer program according to claim 16, further comprising changing the operation of the device from focused mode to non-focused mode responsive to detecting an idle period in user interaction meeting a predetermined threshold interval.

18. The memory medium encoded with a computer program according to claim 16, further comprising changing the operation of the device from non-focused mode to focused mode responsive to detecting a confirmation command from the user input.

19. The memory medium encoded with a computer program according to claim 16, further comprising enabling or disabling the access to the non-focused mode.

20. The memory medium encoded with a computer program according to claim 16, further comprising receiving user instructions and of enabling or disabling the access to the non-focused mode responsive to the user instructions.

21. The memory medium encoded with a computer program according to claim 16, where in the non-focused mode none of the objects of the displayed presentation page is focused.

22. A method comprising:
displaying a single presentation page of two or more available presentation pages on a device where the single displayed presentation page comprises content comprising a plurality of displayed objects, from which one of the displayed objects is presented as a focused object;
detecting at least one user selected navigation commands on the device; and
changing the operation of the device between a focused mode and a non-focused mode where
in the focused mode a displayed object of the displayed presentation page presented as a focused object is changed to another displayed object of the single displayed presentation page being presented as the focused object in response to the detected user selected navigation commands, and where
in the non-focused mode the single displayed presentation page is switched to another one of the two or more available presentation pages in response to the same user selected navigation command.

23. The method according to claim 22, wherein changing the operation of the device from focused mode to non-focused mode is in response to detecting an idle period in user interaction meeting a predetermined threshold interval.

24. The method according to claim 22, wherein changing the operation of the device from non-focused mode to focused mode is in response to detecting a confirmation command from the user input.

25. The method according to claim 22, wherein the displayed presentation page is from a set of different presentation pages, and wherein the different presentation pages comprise different content including user selectable objects.

26. The method according to claim 22, wherein the display is configured to display the presentation page from a set of different presentation pages when the device is idle and wherein the non-focused mode the user input is configured to enable navigating between the different presentation pages so that a navigation command changes a presented presentation page to another one dependent on the currently presented presentation page.

27. The method according to claim 22, wherein the non-focused mode the user input is enabled to navigate between the different presentation pages so that each presentation page is mapped to a corresponding navigation command.

28. The method according to claim 22, wherein the same user input causes the focused object to change when operating in a focused mode and causes the presentation page to change when operating in a non-focused mode.

29. The method according to claim 22, where in the non-focused mode none of the objects of the displayed presentation page is focused.

* * * * *